United States Patent
Chen (10) Patent No.: US 10,302,977 B2
(45) Date of Patent: May 28, 2019

(54) DRIVING METHODS OF DISPLAY PANELS, DRIVING DEVICES, AND DISPLAY DEVICES

(71) Applicant: SHENZHEN CHINA STAR OPTOELECTRONICS TECHNOLOGY CO., LTD., Guangdong (CN)

(72) Inventor: Shuai Chen, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 66 days.

(21) Appl. No.: 15/323,801

(22) PCT Filed: Jan. 3, 2017

(86) PCT No.: PCT/CN2017/000034
§ 371 (c)(1),
(2) Date: Jan. 4, 2017

(87) PCT Pub. No.: WO2018/103170
PCT Pub. Date: Jun. 14, 2018

(65) Prior Publication Data
US 2018/0188577 A1 Jul. 5, 2018

(30) Foreign Application Priority Data
Dec. 8, 2016 (CN) .................. 2016 1 1121863X (51) Int. Cl.
G02F 1/133 (2006.01)
G09G 3/06 (2006.01)
G09G 3/00 (2006.01)
G09G 3/34 (2006.01)
G09G 3/36 (2006.01)

(52) U.S. Cl.
CPC ......... G02F 1/13306 (2013.01); G09G 3/006 (2013.01); G09G 3/06 (2013.01); G09G 3/3413 (2013.01); G09G 3/36 (2013.01); G09G 2310/0264 (2013.01); G09G 2320/028 (2013.01); G09G 2320/0242 (2013.01);
(Continued)

(58) Field of Classification Search
CPC ....................................................... G06T 3/00
See application file for complete search history.

(56) References Cited

U.S. PATENT DOCUMENTS

2016/0055617 A1* 2/2016 McLaughlin ............. G06T 3/00
345/666

FOREIGN PATENT DOCUMENTS

CN 102645797 A 8/2012
CN 103035191 A 4/2013
(Continued)

Primary Examiner — Robin J Mishler
(74) Attorney, Agent, or Firm — Andrew C. Cheng (57) ABSTRACT

The present disclosure relates to a driving method of display panels, a driving device and a display device. The driving method includes dividing a display panel to a plurality of areas, and applying a white balance process respectively to the plurality of areas in accordance with a relationship between the areas and viewing angles of the user. As such, the white balance performance of the areas of the display panel may correspond to the viewing angle from the user to the area. Thus, the color shift issue arising due to the viewing angles may be eliminated so as to enhance the display performance.

6 Claims, 6 Drawing Sheets

(52) U.S. Cl.
CPC ............... *G09G 2320/068* (2013.01); *G09G 2320/0666* (2013.01)

(56) References Cited

FOREIGN PATENT DOCUMENTS

| | | |
|---|---|---|
| CN | 104297960 A | 1/2015 |
| JP | 2009218641 A | 9/2009 |
| JP | 5123010 B2 | 1/2013 |

\* cited by examiner

DRIVING METHODS OF DISPLAY PANELS, DRIVING DEVICES, AND DISPLAY DEVICES

BACKGROUND OF THE INVENTION

1. Field of the Invention

The present disclosure relates to display technology, and more particularly to a driving method of display panels, a driving device, and a display device.

2. Discussion of the Related Art

Liquid crystal displays (LCDs) are flat and super thin display devices including a certain number colorful or black/white pixels. The LCDs are generally arranged in front of a light source of a reflective surface. The power consumption of the LCDs is low, and the LCDs are characterized by attributes, such as high performance, small dimension, and light weight, and thus have been a main trend of display devices. Currently, thin film transistor (TFT) LCD is very poplar, and the liquid crystal panel is a key component of LCD. The liquid crystal panel generally includes a color-film (CF) substrate, a TFT array substrate opposite to the CF substrate, and a liquid crystal layer between the two substrates. With the development of the flat display technology, the demand toward high performance is getting higher and higher, such as brightness, color degree, resolution, viewing angle, and the refresh rate.

With the development of the display technology, large-scale display panels have been a hot topic. However, the light transmittance may be quite different in accordance with different viewing angles. When an user is in a specific location, the light transmittance between the area where the user is facing and the area where the user is viewing from a lateral-view may be different.

SUMMARY

The present disclosure relates to a driving method of display panels, a driving device, and a display device. The driving method of display panels may enhance the color shift issue when the viewing angles are different.

In one aspect, a display device includes: a display panel and a driving device driving the display panel, and the display couples with the driving device; the driving device is configured to: divide a display panel to a plurality of areas; apply a white balance process respectively to the plurality of areas in accordance with a relationship between the areas and an viewing angle of an user; wherein the driving device is configured to:

determine the viewing angle of the user with respect to each of the areas; and look up a white balance driving voltage corresponding to the viewing angle with respect to the areas from a predetermined white balance reference table, and adopt the white balance driving voltage to apply the white balance process respectively to the areas.

Wherein the driving device is configured to: determine a reference area from the plurality of areas, and set the viewing angle of the reference area as a setting angle value; and determine the viewing angles of other areas in accordance with a location relationship between the reference area and each of the areas among the plurality of areas.

Wherein the driving device is configured to: obtain a display mode selected by the user, and determine the reference area corresponding to the display mode, wherein different display modes are configured with corresponding areas; or obtain an user location, and select a closest area with respect to the user location to be the reference area.

In another aspect, a driving device of display panels includes: a process and a storage, and the processor couples with the storage, the storage stores the instructions executed by the processor, and the processor is configured to: divide a display panel to a plurality of areas; and apply a white balance process respectively to the plurality of areas in accordance with a relationship between the areas and an viewing angle of an user.

Wherein the storage stores a predetermined white balance reference table, and the processor is configured to: determine the viewing angles from the user to each of the plurality of areas; look up a white balance driving voltage from the predetermined white balance reference table in accordance with the viewing angle of each of the areas, and adopt the corresponding white balance driving voltage respectively to apply the white balance process to each of the areas.

Wherein the processor is configured to: determine a reference area from the plurality of areas, and set the viewing angle of the reference area as a setting angle value; and determine the viewing angles of other areas in accordance with a location relationship between the reference area and each of the areas among the plurality of areas.

Wherein the driving device further includes a sensor coupling with the processor; the sensor is configured to obtain a display mode selected by an user or to obtain an user location; the processor is configured to: wherein the driving device is configured to: obtain a display mode selected by the user via the sensor, and determine the reference area corresponding to the display mode, wherein different display modes are configured with corresponding areas; or obtain an user location via the sensor, and select a closest area with respect to the user location to be the reference area.

In another aspect, a driving method of display panels includes: dividing a display panel to a plurality of areas; applying a white balance process respectively to the plurality of areas in accordance with a relationship between the areas and an viewing angle of an user.

Wherein the step of applying a white balance process respectively to the plurality of areas in accordance with a relationship between the areas and an viewing angle of an user further includes: determining the viewing angle of the user with respect to each of the areas; and looking up a white balance driving voltage corresponding to the viewing angle with respect to the areas from a predetermined white balance reference table, and adopting the white balance driving voltage to apply the white balance process respectively to the areas.

Wherein the step of determining the viewing angle of the user with respect to each of the areas further includes: determining a reference area from the plurality of areas, and setting the viewing angle of the reference area as a setting angle value; and determining the viewing angles of other areas in accordance with a location relationship between the reference area and each of the areas among the plurality of areas.

Wherein the step of determining a reference area from the plurality of areas further includes: obtaining a display mode selected by the user, and determining the reference area corresponding to the display mode, wherein different display modes are configured with corresponding areas; or obtaining an user location, and selecting a closest area with respect to the user location to be the reference area.

Wherein after the display panel is divided into the plurality of areas, the method further includes: combining an most-lateral area and each of the other areas to obtain a plurality of area combinations, and to calculate an included angle formed by a connecting line from a central location of two areas within each of the area combination and the viewing location, and the included angle is adopted as a testing viewing angle; with respect to the various testing viewing angles, different white balance driving voltages are adopted to drive the display panel so as to obtain white balance performances with respect to a plurality of testing viewing angles and a plurality of white balance driving voltages; and selecting the white balance driving voltage corresponding to an optimal white balance performance observed from each of the testing viewing angles to be the white balance driving voltage corresponding to each of the testing viewing angles.

In view of the above, the driving method divides the display panel into a plurality of areas and applies the white balance performance respectively to each of the areas in accordance with the relationship between the areas and the viewing angles of the user. As such, the white balance performance of the areas of the display panel may correspond to the viewing angle from the user to the area. Thus, the color shift issue arising due to the viewing angles may be eliminated so as to enhance the display performance.

DETAILED DESCRIPTION OF THE EMBODIMENTS

Embodiments of the invention will now be described more fully hereinafter with reference to the accompanying drawings, in which embodiments of the invention are shown. In the drawings, the same reference numerals are adopted to represent the same steps or modules within the whole disclosure and the drawings.

White balance relates to white precision generated by mixing the red, green, and blue light beams of the display panel. The display panel control the ratios relating to the brightness of each of the three colors so as to display the colors. Thus, the color shift issue relates to the problem wherein the ratios of the brightness of the three colors are different.

The light transmittance of the three base colors of the display panel may be conceived by the equation below:

$$T = \frac{1}{2}\sin^2(2\varphi)\sin^2\left(\frac{\pi \Delta nd}{\lambda}\right)$$

Wherein φ represents the azimuth angle of liquid crystals, Δnd represents the varying factors of the light transmittance, Δn represents the difference of the reflective rates between the normal light beams and abnormal light beams caused by the birefringence of the liquid crystals, d represents a cell gap, λ represents the wavelength of the light beams incident on the liquid crystals. With respect to the VA display mode, the azimuth angle (φ) is a fixed value, however, the varying factors of the light transmittance (Δnd) may be different when the viewing angles are different. Thus, when the viewing angles are different, the light transmittance of the red light beams, the green light beams, and the blue light beams may be different.

Figure 1:
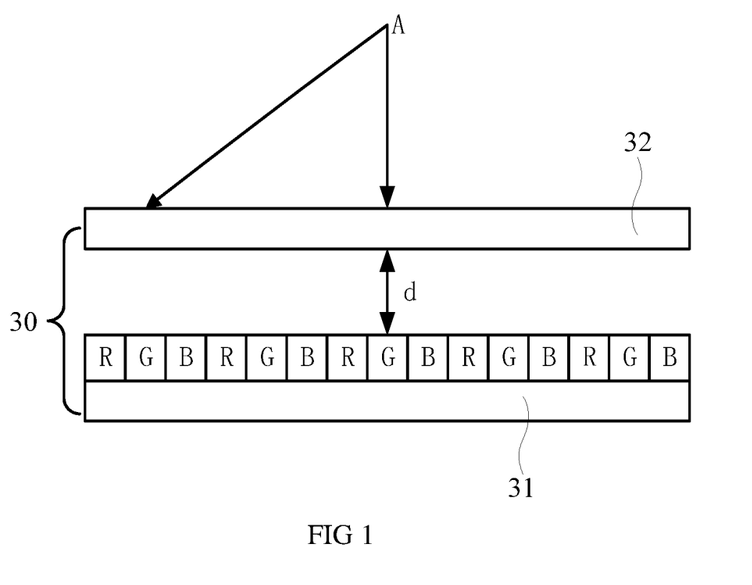
FIG. 1 is a schematic view showing the structure of the display panel in accordance with one embodiment.

FIG. 1 is a schematic view showing the structure of the display panel 30 in accordance with one embodiment. The display panel 30 includes a top substrate 32, a down substrate 31, and liquid crystals configured between the top substrate 32 and the down substrate 31. A color-filter layer is arranged at one side of the top substrate 32 closer to the down substrate 31 or is arranged at one side of the down substrate 31 closer to the top substrate 32. The color-filter layer includes a red photo-resistor (R), a green photo-resistor (G), and a blue photo-resistor (B) arranged in sequence. The cell gap (d) with respect to the whole display panel 30 is the same.

When the user standing in point "A" views the display panel 30, the viewing angles toward a central area and an edge area are different, and the variations are the same. At this moment, the varying factors of the light transmittance (Δnd) with respect to the three base colors are decreased. In addition, the variations of the varying factors of the light transmittance (Δnd) are the same. In an example, the variation amounts of the light beams with respect to the red light beams, the green light beams, and the blue light beams are respectively ΔTr, ΔTg, and ΔTb. As the relationship between the wavelengths of the red light beams, the green light beams, and the blue light beams is λr>λg>λb, the variation amounts of the three base colors may be shown as ΔTr<ΔTg<ΔTb. Thus, from the central area to the edge area, the variation amount of the light transmittance of the red light beams is the smallest one, and the brightness of the red light beams in the edge area of the display panel 30 is the highest. As such, the white balance of the central area of the display panel 30 is different from that of the edge area. Conventionally, a white-balance driving voltage may be adopted when the user is right in front of the display panel 30. However, such solution cannot eliminate the difference between the white balance of the central area and of the edge area. When the user standing in the point "A", the color shown in the edge area may be redder than the central area, and the color shift issue is serious.

Figure 2:
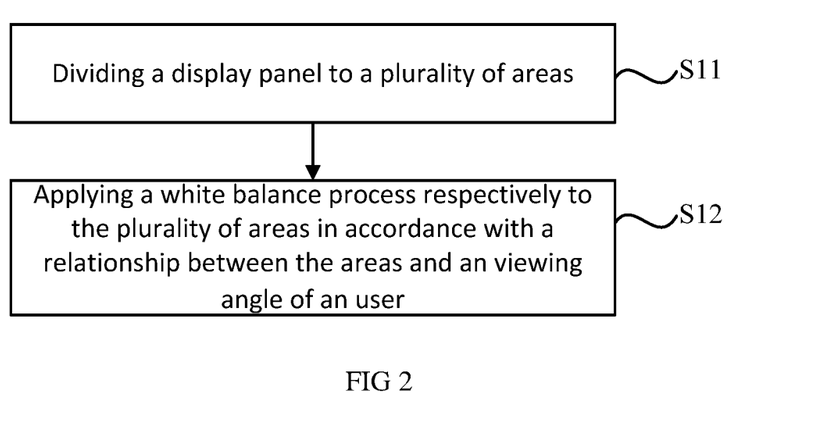
FIG. 2 is a flowchart showing the driving method of display panels in accordance with a first embodiment.

FIG. 2 is a flowchart showing the driving method of display panels in accordance with a first embodiment. The driving method includes the following steps.

In step S11, dividing a display panel to a plurality of areas.

The display panel may have color shift issue in accordance with the viewing angles.

The display panel may be divided into a plurality of area from a central area toward the edge area in accordance with the dimension of the display panel. The number of the areas is not limited in the present disclosure. It can be understood that while a higher degree of white balance is required, a greater number of the areas have to be defined. In addition, when the user views right in front of the central area, the color shift issue may be worse with respect to the edge area. Thus, the number of the areas in the central portion of the display panel may be fewer than the number of the areas in the edge portion of the display panel.

In step S12, applying a white balance process respectively to the plurality of areas in accordance with a relationship between the area and the viewing angle of an user.

Figure 3:
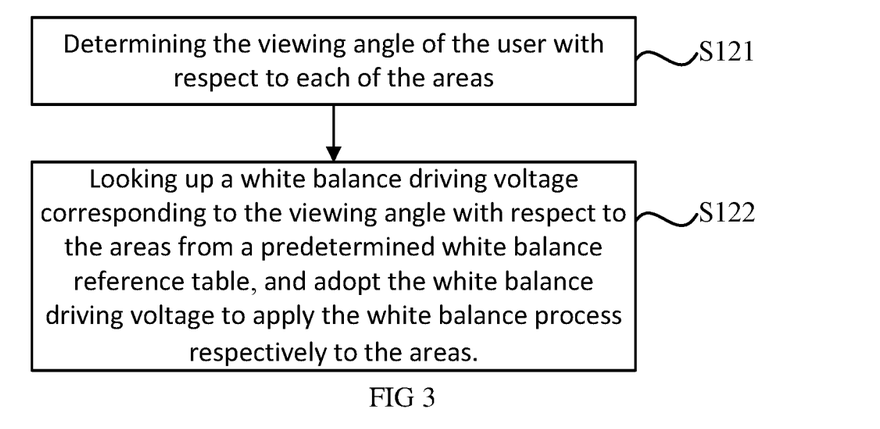
FIG. 3 is a flowchart showing the step "S12" in FIG. 2.

In addition, as shown in FIG. 3, the step S12 includes the following steps:

In step S121, determining the viewing angle of the user with respect to each of the areas.

As the viewing angles from the user toward the plurality of areas are different, and thus it is the first step to determine the viewing angle of the user with respect to each of the areas.

In the embodiment, the step of determining the viewing angle of the user with respect to each of the areas includes the following steps:

selecting a reference area selected from the plurality of areas, setting the viewing angle of the reference area as a configured angle, and determining the viewing angles of the other areas in accordance with a location relationship between the reference area and the other areas.

Wherein one area is selected from the areas as the reference area, and the viewing angle of the reference area is set as the configured angle. That is, the viewing angle of the user toward the reference area is a pre-determined angle. Alternatively, the area having the viewing angle equaling to 0 is configured as the reference area, and the area right in front of the user is the reference area.

As the locations of the user may differ, and the corresponding reference areas may be different. In an embodiment, the reference area may adopt a display mode selected by the user, and the reference area may be determined in accordance with the display mode. That is, a plurality of pre-determined display modes are configured to corresponding reference areas. When the display mode is selected by the user, the corresponding reference area is determined. To avoid the scenario that the reference areas are overlapped, alternatively, the display modes are configured with different reference areas. That is, each of the display modes map to one reference areas. At this moment, when the display mode is determined, the corresponding reference area is determined.

In addition, the area closest to the user may be determined as the reference area. When the user views the display panel, generally, the closest area is the area right in front of the user. Thus, in the embodiment, a sensing device may be configured to obtain the location of the user, and the closest area is configured as the reference area.

After the reference area is determined, the location relationship between the reference area and other areas may be determined, and the viewing angles from the user toward other areas may also be determined. In an example, a virtual viewing location on a central line of the reference area is configured, and the viewing angle of other areas is the included angle formed by the line between a central point of the other areas to the location of the viewer and the central line.

Figure 4:
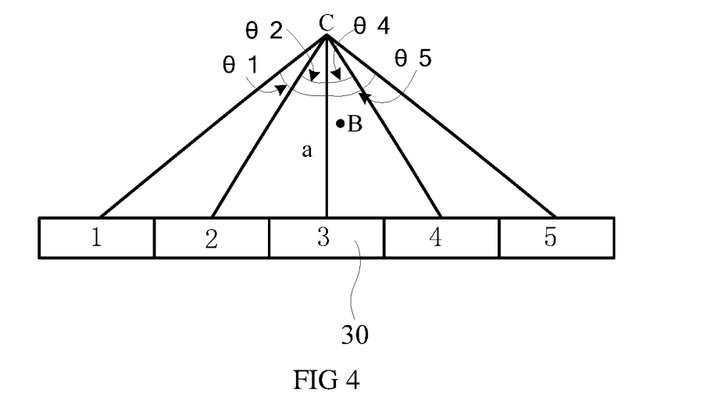
FIG. 4 is a schematic view showing the structure of the display panel in step "S121" in FIG. 3.

The process of determining the viewing angles from the user to the areas will be described hereinafter. As shown in FIG. 4, the display panel 30 is divided into five areas, and the five areas are labeled as Area1 to Area5. If the user is located at Point B, after the sensing device obtains the user location, it is determined that Area3 is the closest area with respect to Point B, and thus Area3 is determined as the reference area. The virtual viewing location (C) on a central line "a" of the Area3 is configured, and the viewing angles of the other areas may be defined by the included angle formed by the connecting line from the central point of the area to the virtual viewing location (C) and the central line "a". As shown in FIG. 4, the viewing angles for Area1 through Area5 are respectively θ1, θ2, 0 degree, θ4 and θ5. It can be understood that the user location "A" may not overlap with the virtual viewing location (B). When the user location "A" is within a range of Area3, the viewing angle from the user to Area3 equals to 0 degree.

In step S122, looking up a white balance driving voltage corresponding to the viewing angle with respect to the areas from a predetermined white balance reference table, and adopting the white balance driving voltage to apply the white balance process respectively to the areas.

The predetermined white balance reference table is configured to store the relationship between the viewing angle and the white balance voltage. The viewing angle may be used to look up the white balance driving voltage in view of the white balance reference table.

In step S121, after the viewing angle from the user to the areas is determined, the corresponding white balance driving voltage may be looked up from the white balance reference table. Afterward, the white balance driving voltage may be adopted to apply the white balance process to the areas of the display panel. As such, the white balance performance of each of the areas may correspond to the viewing angle of the user so as to eliminate the color shift issue and to enhance the display performance of the display panel.

Figure 5:
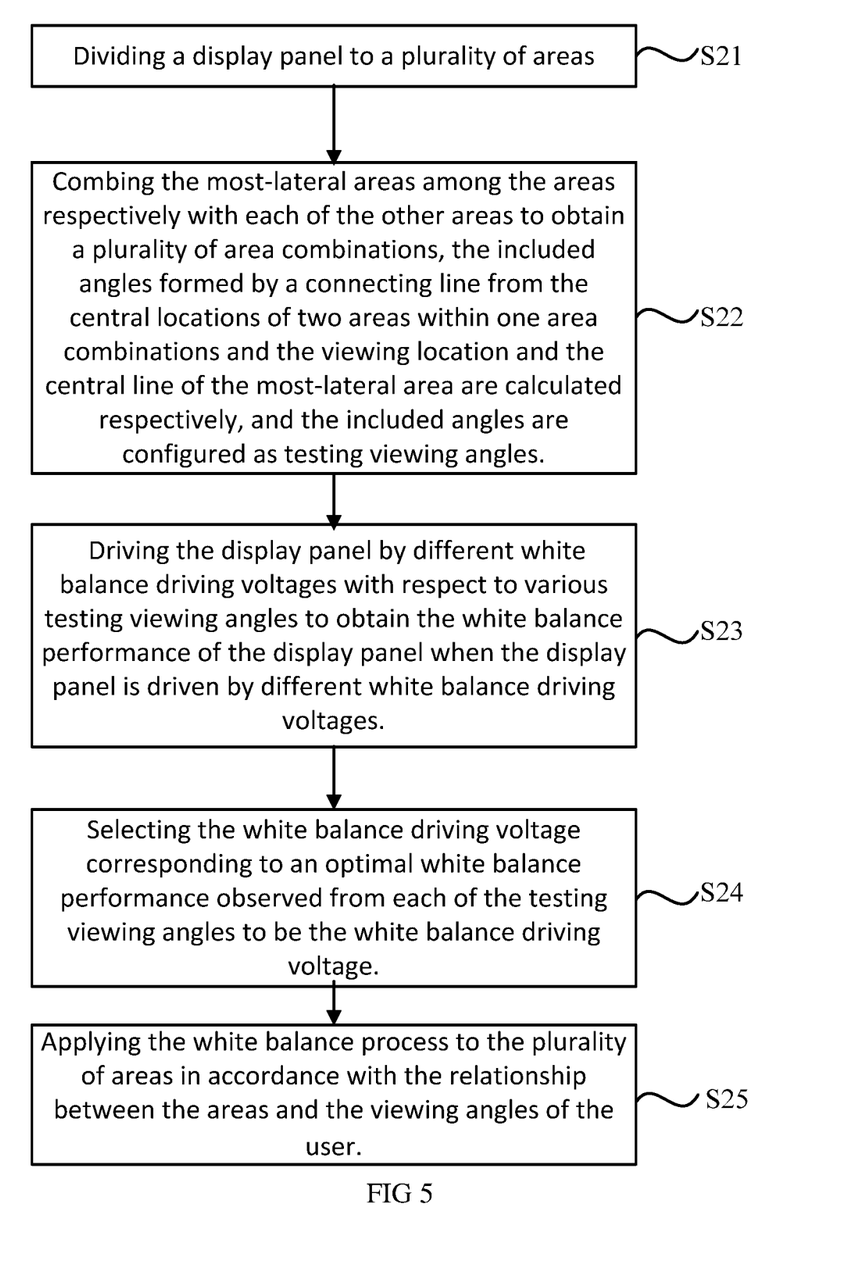
FIG. 5 is a flowchart showing the driving method of display panels in accordance with a second embodiment.

FIG. 5 is a flowchart showing the driving method of display panels in accordance with a second embodiment. The method includes the following steps.

In step S21, dividing a display panel to a plurality of areas.

The step is similar to the step S11 in FIG. 1, and thus the detailed description is omitted hereinafter.

In step S22, the most-lateral areas among the areas are respectively combined with each of the other areas to obtain a plurality of area combinations. In addition, the included angles formed by central locations of two areas within one area combinations and the connecting line are calculated respectively, and the included angles are configured as testing viewing angles.

The step is configured to determine a plurality of testing viewing angles so as to map the viewing angle with the optical white balance driving voltage. In order to obtain greater number of testing viewing angles, the most-lateral areas are respectively combined with the each of the other areas to obtain the plurality of area combinations. That is, the most-lateral areas respectively combined with each of the other areas to form a plurality of area combinations. The viewing location on the central line of the most-lateral are is configured, and the testing viewing angle relates to the included angle formed by the connecting line from the central location of the each of the other areas and the viewing location and the central line.

In step 23, the display panel is driven by different white balance driving voltages with respect to various testing viewing angles to obtain the white balance performance of the display panel when the display panel is driven by different white balance driving voltages.

The various testing viewing angles are determined in step S22, and various white balance driving voltages are adopted to drive the display panel so as to obtain the white balance performance of the display panel when the display panel is driven by different white balance driving voltages. As the viewing angles are different, the white balance performance with respect to different areas are different. Thus, when the different white balance driving voltages are adopted to obtain the white balance performance for each of the testing viewing angles. Specifically, one viewing location is configured. In step S22, the viewing location is adopted to observe the white balance performance for each of the testing viewing angles when the white balance driving voltages are adopted to drive the display panel. In the embodiment, the white balance performance may be obtained by various solutions, such as user observation or analysis of the display image via a detection device.

Figure 6A:
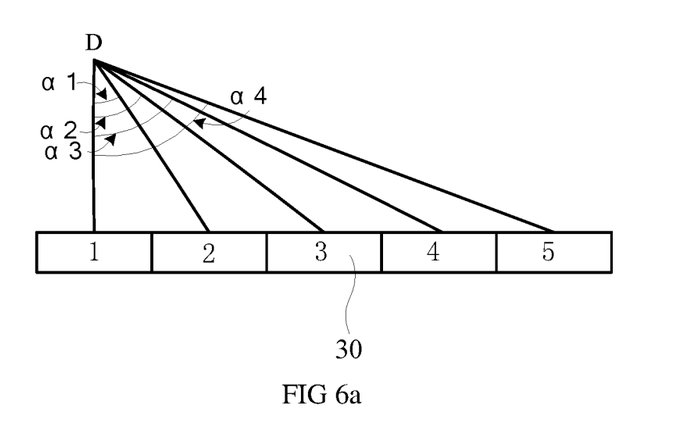
FIG. 6a is a flowchart showing the step "S22" in FIG. 5.

The detailed descriptions regarding step S22 and S23 will be described hereinafter. As shown in FIG. 6a, the display panel 30 is divided into Area1 through Area5, wherein Area1 and Area5 are the most-lateral areas, and Area1 (or Area5) may be selected to be combined with the each of the other areas. In an example, Area1 and Area2, Area1 and Area3, Area1 and Area4, Area1 and Area5 are combined to obtain four area combinations. A viewing location (D) on the central line of Area1 is configured, and the viewing angles are defined by the included angle formed by the connecting line from the central locations respectively of Area2 through Area5 and the viewing location (D) and the central line of Area1. At this moment, the testing viewing angles are respectively 0 degree, α1, α2, α3, and α4.

Figure 6B:
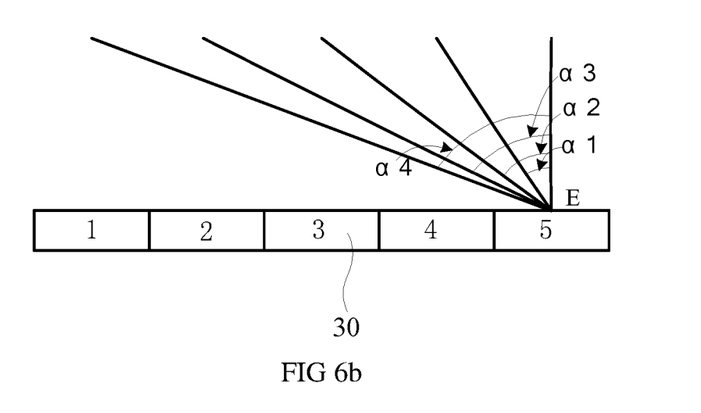
FIG. 6b is a schematic view showing the structure of the display panel in step "S23" in FIG. 5.

As shown in FIG. 6b, the central location of one of the areas is configured as the viewing location (E). In step S22, the testing viewing angles are respectively 0 degree, α1, α2, α3, and α4, and different white balance driving voltages are adopted to drive the display panel 30. As such, when the display panel 30 is driven by different white balance driving voltages, the white balance performance of each of the areas may be observed from the viewing location (E).

In step S24, selecting the white balance driving voltage corresponding to an optimal white balance performance observed from each of the testing viewing angles to be the white balance driving voltage.

In step S24, the white balance driving voltage corresponding to an optimal white balance performance observed from each of the testing viewing angles is selected to be the white balance driving voltage. As such, the viewing angles and the white balance driving voltages needed by the various viewing angles may be determined. In addition, the viewing angle and the corresponding white balance driving voltage are adopted to establish the white balance reference table.

In step S25, applying the white balance process to the plurality of areas in accordance with the relationship between the areas and the viewing angles of the user.

The step S25 is similar to step S12 in FIGS. 2 and 3, and thus the detailed operations are omitted hereinafter.

Figure 7:
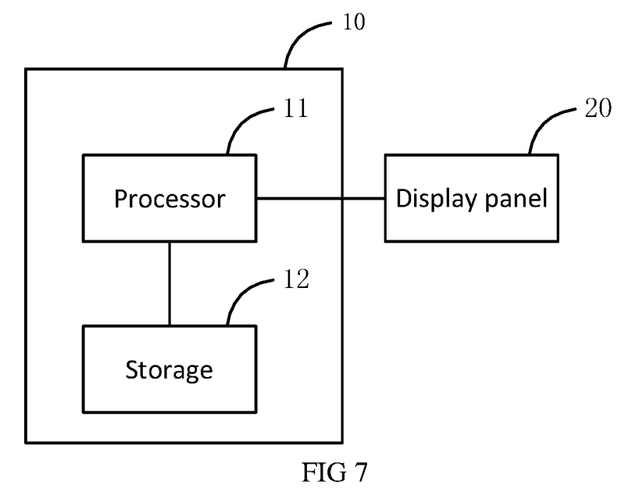
FIG. 7 is a block diagram of the driving device in accordance with the first embodiment.

FIG. 7 is a block diagram of the driving device in accordance with the first embodiment. As shown in FIG. 7, the driving device 10 includes a processor 11 and a storage 12 coupling with the processor 11, and the processor 11 connects to a display panel 20.

The storage 12 is configured to store the instructions executed by the processor 11.

The processor 11 is configured to divide the display panel 20 to a plurality of areas in accordance with the instructions stored within the storage 12, and to apply the white balance process to the plurality of areas in accordance with the relationship between the areas and the viewing angles of the user.

In addition, the storage 12 is also configured to store a predetermined white balance reference table.

The processor 11 is also configured to: determine the viewing angles from the user to the each of the plurality of areas; look up the white balance driving voltage in accordance with the viewing angle of the areas; and apply the white balance process to each of the areas via the looked up white balance driving voltage.

The processor 11 is also configured to: determine a reference area from the plurality of areas; set the viewing angle of the reference area as a setting angle value; and determine the viewing angles of other areas in accordance with the location relationship between the reference area and each of the areas among the plurality of areas.

In addition, the processor 11 is configured to combine the most-lateral area and each of the other areas to come out a plurality of area combinations, and to calculate the included angle fromed by the connecting line of the central location of two areas within each of the area combination and the viewing location. The included angles are considered as the testing viewing angles. Among the various testing viewing angles, different white balance driving voltages are adopted to drive the display panel so as to obtain the white balance performance with respect to a plurality of testing viewing angles and a plurality of white balance driving voltages. The white balance driving voltage with the optical performance with respect to various viewing angles are configured as the needed white balance driving voltages. Further, the processor 11 is configured to store the predetermined white balance reference table storing the relationship between the viewing angles and the white balance driving voltages, and the predetermined white balance reference table is stored within the storage 12.

Figure 8:
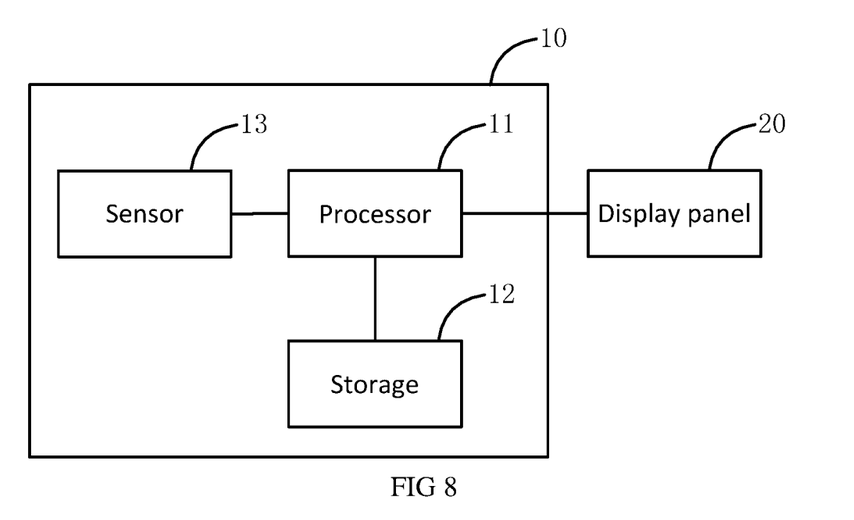
FIG. 8 is a block diagram of the driving device in accordance with the second embodiment.

In addition, as shown in FIG. 8, the driving device also include a sensor 13 coupling with the processor 11.

The sensor 13 is configured to obtain a display mode selected by an user or to obtain user location.

The processor 11 is further configured to: obtain the display mode selected by the user via the sensor 13; determine the reference area corresponding to the display mode, wherein different display modes are configured with corresponding areas; or obtain the user location via the sensor 13, and select the closest area with respect to the user location to be the reference area.

Figure 9:
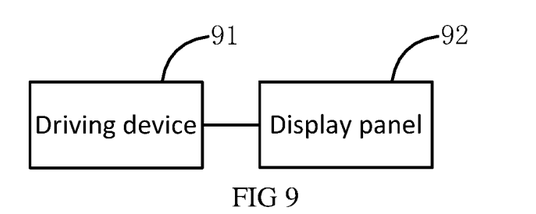
FIG. 9 is a schematic view showing the display device in accordance with one embodiment.

FIG. 9 is a schematic view showing the display device in accordance with one embodiment. As shown in FIG. 9, the display device includes a display panel 92 and a driving device 91 for driving the display panel 92, and the display panel 92 couples with the driving device 91.

The driving device 91 is configured to divide the display panel 92 into a plurality of areas, and to apply the white balance process respectively to the areas in accordance with the relationship between the areas and the viewing angles of the user.

It can be understood that the driving device 91 may be the driving device 10 in FIG. 7 or 8. In addition, the instructions executed by the driving device 91 may correspond to the driving methods in the first or the second embodiments, as shown in FIGS. 2-5.

In view of the above, the driving method divides the display panel into a plurality of areas and applies the white balance performance respectively to each of the areas in accordance with the relationship between the areas and the viewing angles of the user. As such, the white balance performance of the areas of the display panel may correspond to the viewing angle from the user to the area. Thus, the color shift issue arising due to the viewing angles may be eliminated so as to enhance the display performance.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A display device, comprising:
a display panel, a sensor configured to obtain a location of an user, and a driving device driving the display panel, and the display couples with the driving device;
the driving device is configured to:
divide a display panel to a plurality of areas;
apply a white balance process respectively to the plurality of areas in accordance with a relationship between the areas and an viewing angle of the user;
wherein the driving device is configured to:
determine the viewing angle of the user with respect to each of the areas; and
look up a white balance driving voltage corresponding to the viewing angle with respect to the areas from a predetermined white balance reference table, and adopt the white balance driving voltage to apply the white balance process respectively to the areas, wherein the viewing angle of the user with respect to each of the areas is determined by following steps:
receiving the location of the user from the sensor;
defining the closest area to the location of the user as a reference area with a 0 degree viewing angle of the user;
defining a virtual viewing location on a central line of the reference area, wherein the virtual viewing location is different from the location of the user; and
obtaining the viewing angles of the user of the other areas by an included angle formed by a connecting line from a central point of one of the other areas to the virtual viewing location and the central line.

2. A driving device of display panels, comprising:
a process and a storage, and the processor couples with the storage, the storage stores the instructions executed by the processor, and the processor is configured to:
divide a display panel to a plurality of areas; and
apply a white balance process respectively to the plurality of areas in accordance with a relationship between the areas and an viewing angle of an user, wherein the viewing angle of the user is determined by following steps:
receiving the location of the user from a sensor;
defining the closest area to the location of the user as a reference area with a 0 degree viewing angle of the user;
defining a virtual viewing location on a central line of the reference area, wherein the virtual viewing location is different from the location of the user; and
obtaining the viewing angles of the user of the other areas by an included angle formed by a connecting line from a central point of one of the other areas to the virtual viewing location and the central line.

3. The display device as claimed in claim 2, wherein the storage stores a predetermined white balance reference table, and the processor is configured to:
look up a white balance driving voltage from the predetermined white balance reference table in accordance with the viewing angle of each of the areas, and adopt the corresponding white balance driving voltage respectively to apply the white balance process to each of the areas.

4. A driving method of display panels, comprising:
dividing a display panel to a plurality of areas by a driving device;
obtaining a location of an user by a sensor;
applying a white balance process respectively to the plurality of areas in accordance with a relationship between the areas and an viewing angle of the user by the driving device, wherein the viewing angle of the user is determined by following steps:
receiving the location of the user from the sensor;
defining the closest area to the location of the user as a reference area with a 0 degree viewing angle of the user;
defining a virtual viewing location on a central line of the reference area, wherein the virtual viewing location is different from the location of the user; and
obtaining the viewing angles of the user of the other areas by an included angle formed by a connecting line from a central point of one of the other areas to the virtual viewing location and the central line.

5. The display method as claimed in claim 4, wherein the step of applying the white balance process respectively to the plurality of areas in accordance with the relationship between the areas and the viewing angle of the user further comprises:
looking up a white balance driving voltage corresponding to the viewing angle with respect to the areas from a predetermined white balance reference table, and adopting the white balance driving voltage to apply the white balance process respectively to the areas.

6. The display method as claimed in claim 5, wherein a method for establishing the predetermined white balance reference table comprises:
combining an most-lateral area and each of the other areas to obtain a plurality of area combinations, and to calculate an included angle formed by a connecting line from a central location of two areas within each of the area combination and the viewing location, and the included angle is adopted as a testing viewing angle;
with respect to the various testing viewing angles, different white balance driving voltages are adopted to drive the display panel so as to obtain white balance performances with respect to a plurality of testing viewing angles and a plurality of white balance driving voltages; and
selecting the white balance driving voltage corresponding to an optimal white balance performance observed from each of the testing viewing angles to be the white balance driving voltage corresponding to each of the testing viewing angles.

* * * * *